(12) United States Patent
Song (10) Patent No.: US 12,000,322 B2
(45) Date of Patent: Jun. 4, 2024

(54) POST INJECTION CONTROL METHOD DURING EXHAUST BRAKE OPERATION

(71) Applicants: HYUNDAI MOTOR COMPANY, Seoul (KR); KIA MOTORS CORPORATION, Seoul (KR)

(72) Inventor: Byeong Gyu Song, Cheongju-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 454 days.

(21) Appl. No.: 17/065,680

(22) Filed: Oct. 8, 2020

(65) Prior Publication Data

US 2021/0254533 A1 Aug. 19, 2021

(30) Foreign Application Priority Data

Feb. 17, 2020 (KR) .................. 10-2020-0018921

(51) Int. Cl.
*F01N 9/00* (2006.01)
*F01N 3/025* (2006.01)
*F02D 41/02* (2006.01)
*F02D 41/40* (2006.01)

(52) U.S. Cl.
CPC .......... *F01N 9/002* (2013.01); *F01N 3/0253* (2013.01); *F02D 41/029* (2013.01); *F02D 41/405* (2013.01)

(58) Field of Classification Search
CPC ........ F01N 9/002; F01N 9/06; F01N 2240/36; F01N 2430/08; F01N 3/0253; F01N 2560/06; F01N 2560/08; F01N 2610/146; F01N 2900/1602; F02D 41/029; F02D 41/405; F02D 41/12; F02D 41/1446; F02D 41/0235
USPC .......................................... 60/295
See application file for complete search history.

(56) References Cited

U.S. PATENT DOCUMENTS

| | | | | |
|---|---|---|---|---|
| 5,218,818 A | * | 6/1993 | Ahmann ................. | F01L 13/06 60/303 |
| 2010/0024395 A1 | * | 2/2010 | Gotou ...................... | F02D 9/04 60/297 |

* cited by examiner

*Primary Examiner* — Kenneth J Hansen
*Assistant Examiner* — Kelsey L Stanek
(74) *Attorney, Agent, or Firm* — Lempia Summerfield Katz LLC (57) ABSTRACT

A system includes a vehicle operation detector, an exhaust brake operation unit, a diesel oxidation catalyst, a diesel particulate filter, an injector, and a controller for controlling the operation of the injector and the exhaust brake operation unit. A post injection control method during exhaust brake operation for the system includes: determining whether a predetermined regeneration condition of the diesel particulate filter according to the output signals of the vehicle operation detector is satisfied; performing, by the controller, regeneration by controlling the operation of the injector if the regeneration condition is satisfied; determining, by the controller, whether an exhaust brake operation condition is satisfied during regeneration based on the output signals of the vehicle operation detector; and controlling, by the controller, the operation of the injector to perform post-injection with a predetermined amount of fuel when the exhaust brake operation condition is met during the regeneration.

4 Claims, 6 Drawing Sheets

POST INJECTION CONTROL METHOD DURING EXHAUST BRAKE OPERATION

CROSS-REFERENCE TO RELATED APPLICATION

This application claims priority to and the benefit of Korean Patent Application No. 10-2020-0018921, filed on Feb. 17, 2020, the entire contents of which are incorporated herein by reference.

FIELD

The present disclosure relates to a post injection control method. More particularly, the present disclosure relates to a post injection control method during exhaust brake operation.

BACKGROUND

The statements in this section merely provide background information related to the present disclosure and may not constitute prior art.

In diesel engines, a diesel particulate filter (DPF) is used to prevent hydrocarbon exhaust, and when a diesel particulate filter is used, it is important to control technology at an appropriate temperature.

In the case of a commercial vehicle using an exhaust brake, when the exhaust brake is operated, the intake air volume decreases rapidly, and accordingly, the temperature of the diesel oxidation catalyst (DOC) in front of the DPF may rise rapidly. This may cause damage to the diesel oxidation catalyst device or to reduce engine performance.

The above information disclosed in this Background section is only for enhancement of understanding of the background of the present disclosure, and therefore it may contain information that does not form the prior art that is already known to a person of ordinary skill in the art.

SUMMARY

The present disclosure provides a post injection control method capable of preventing a rapid temperature rise of the after treatment device during exhaust brake operation.

A post injection control method during exhaust brake operation according to an exemplary form of the present disclosure may be applied to a system including a vehicle operation detector that detects operation statuses of a vehicle and outputs corresponding signals, an exhaust brake operation unit that controls an exhaust gas flow of an engine, a diesel oxidation catalyst, a diesel particulate filter disposed behind the diesel oxidation catalyst, an injector for injecting fuel, and a controller for controlling the operation of the injector and the exhaust brake operation unit according to the operation signals of the vehicle operation state detection detector. The post injection control method may include: determining, by the controller, whether a predetermined regeneration condition of the diesel particulate filter according to the output signals of the vehicle operation detector is satisfied, performing, by the controller, regeneration by controlling the operation of the injector if the regeneration condition is satisfied, determining, by the controller, whether it corresponds to an exhaust brake operation condition during regeneration according to the output signals of the vehicle operation detector, and controlling, by the controller, the operation of the injector to perform post-injection with a predetermined amount of fuel when the exhaust brake operation condition is met during the regeneration.

The predetermined amount of fuel for the post injection may be determined by the controller by applying a target temperature in front of the diesel particulate filter, an actual temperature in front of the diesel particulate filter, and the current engine RPM (i.e., revolutions per minute) into a predetermined post injection amount control map.

The post injection amount control map may be preset based on by detecting the target temperature in front of the diesel particulate filter, the actual temperature in front of the diesel particulate filter, and the temperature change of the diesel oxidation catalyst according to the engine RPM during regeneration.

The exhaust brake operation condition during regeneration may include a state that a vehicle is overrun.

The exhaust brake operation condition during regeneration may include a state that an exhaust brake operation switch is on.

The exhaust brake operation condition during regeneration may include a state that a brake is in operation.

A post injection control method during exhaust brake operation according to an exemplary form of the present disclosure may be applied to a system including a diesel oxidation catalyst (DOC), a diesel particulate filter (DPF) disposes behind the diesel oxidation catalyst, a vehicle operation detector that detects operation statuses of a vehicle and outputs corresponding signals and includes an exhaust temperature sensor that measures exhaust gas temperature and outputs a corresponding signal, a DPF pressure sensor that measures pressure in front of the diesel particulate filter or differential pressure upstream and downstream of the diesel particulate filter and outputs a corresponding signal, an exhaust brake operation switch, an accelerator position sensor that measures an accelerator opening angle and outputs a corresponding signal, a brake pedal sensor that detects an operation of a brake pedal and outputs a corresponding signal, and an RPM sensor that measures an engine RPM and outputs a corresponding signal, an exhaust brake operation unit that controls an exhaust gas flow of an engine, an injector for injecting fuel, a controller for controlling the operation of the injector and the exhaust brake operation unit according to the operation signals of the vehicle operation state detection detector, and a memory that stores post injection amount in exhaust brake operation during regeneration. The post injection control method may include: determining, by the controller, whether a predetermined regeneration condition of the diesel particulate filter is satisfied according to the output signal of the DPF pressure sensor, a vehicle mileage stored in the memory or a driving time; performing, by the controller, regeneration by controlling the operation of the injector if the regeneration condition is satisfied; determining, by the controller, whether the vehicle is in an overrun state according to the output signals of the accelerator position sensor and the brake pedal sensor; determining, by the controller, whether an exhaust brake operation condition during regeneration is satisfied based on the output signals of the vehicle operation detector; and controlling, by the controller, the operation of the injector to perform post-injection with a predetermined amount of fuel stored in the memory when the exhaust brake operation condition is met during the regeneration.

The predetermined amount of fuel for the post injection may be set by the controller by applying a target temperature in front of the diesel particulate filter, an actual temperature in front of the diesel particulate filter, and the current engine RPM into a predetermined post injection amount control map.

The post injection amount control map may be preset based on the target temperature in front of the diesel particulate filter, the actual temperature in front of the diesel particulate filter, and the temperature change of the diesel oxidation catalyst according to the engine RPM during regeneration.

The exhaust brake operation condition during regeneration may include a state that an exhaust brake operation switch is on.

According to the post injection control method during exhaust brake operation according to an exemplary form of the present disclosure, even if the amount of air sucked into the engine is decreased due to the operation of the exhaust brake, a sudden increase in temperature of the after treatment device can be prevented.

According to the post injection control method during exhaust brake operation according to an exemplary form of the present disclosure, it is possible to prevent damage to the after treatment device due to an increase in exhaust temperature and to prevent engine performance degradation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration.

As those skilled in the art would realize, the described forms may be modified in various different ways, all without departing from the spirit or scope of the present disclosure.

Throughout the specification, parts marked with the same reference number mean the same constituent elements.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, unless explicitly described to the contrary, the word "comprise", and variations such as "comprises" or "comprising", will be understood to imply the inclusion of stated elements but not the exclusion of any other elements.

An exemplary form of the present disclosure will hereinafter be described in detail with reference to the accompanying drawings.

Figure 1:
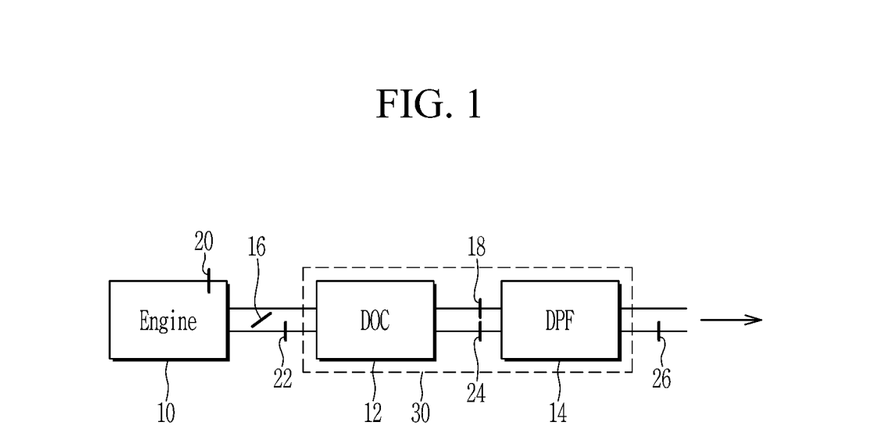
FIG. 1 is a schematic diagram of an after treatment system to which a post injection control method during exhaust brake operation in an exemplary form of the present disclosure can be applied.

FIG. 1 is a schematic diagram of an after treatment system to which a post injection control method during exhaust brake operation according to an exemplary form of the present disclosure can be applied.

Referring to FIG. 1, to purify exhaust gas exhausted from an engine 10, a diesel oxidation catalyst (DOC; 12) is disposed in downstream of the engine 10, and a diesel particulate filter (DPF; 14) is disposed behind (e.g., in the downstream) the diesel oxidation catalyst 12.

The diesel oxidation catalyst 12 is a device that is mounted on a diesel engine to reduce carbon monoxide (CO), hydrocarbon (HC) and particulate material (PM) etc. exhaust, and is obvious to a person skilled in the art, and thus detailed description of specific configuration and function will be omitted.

The diesel particulate filter 14 is a device that is mounted to remove particulate material (PM) or soot from the exhaust gas of the diesel engine, and is obvious to a person skilled in the art, and thus detailed description of specific configuration and function will be omitted.

The diesel oxidation catalyst 12 and the diesel particulate filter 14 can be installed in separate configurations or can be installed in one after treatment device housing 30.

An exhaust temperature sensor 18 that measures the exhaust gas temperature and outputs a corresponding signal can be mounted upstream of the diesel particulate filter 14.

A DPF pressure sensor 24 that measures exhaust gas pressure and outputs a corresponding signal may be mounted upstream of the diesel particulate filter 14, and a DPF pressure sensor 26 may also be mounted downstream of the diesel particulate filter 14. That is, the DPF pressure sensors 24 and 26 are mounted upstream and downstream of the diesel particulate filter 14 to measure the differential pressure.

The engine 10 may be equipped with an injector 20 that injects fuel, and the injector 20 may perform post-injection for regeneration of the diesel particulate filter 14.

In addition, a post injector 22 for the regeneration of the diesel particulate filter 14 may be installed upstream of the diesel oxidation catalyst 12.

An exhaust brake valve 16 can be installed downstream of the engine 10.

Figure 2:
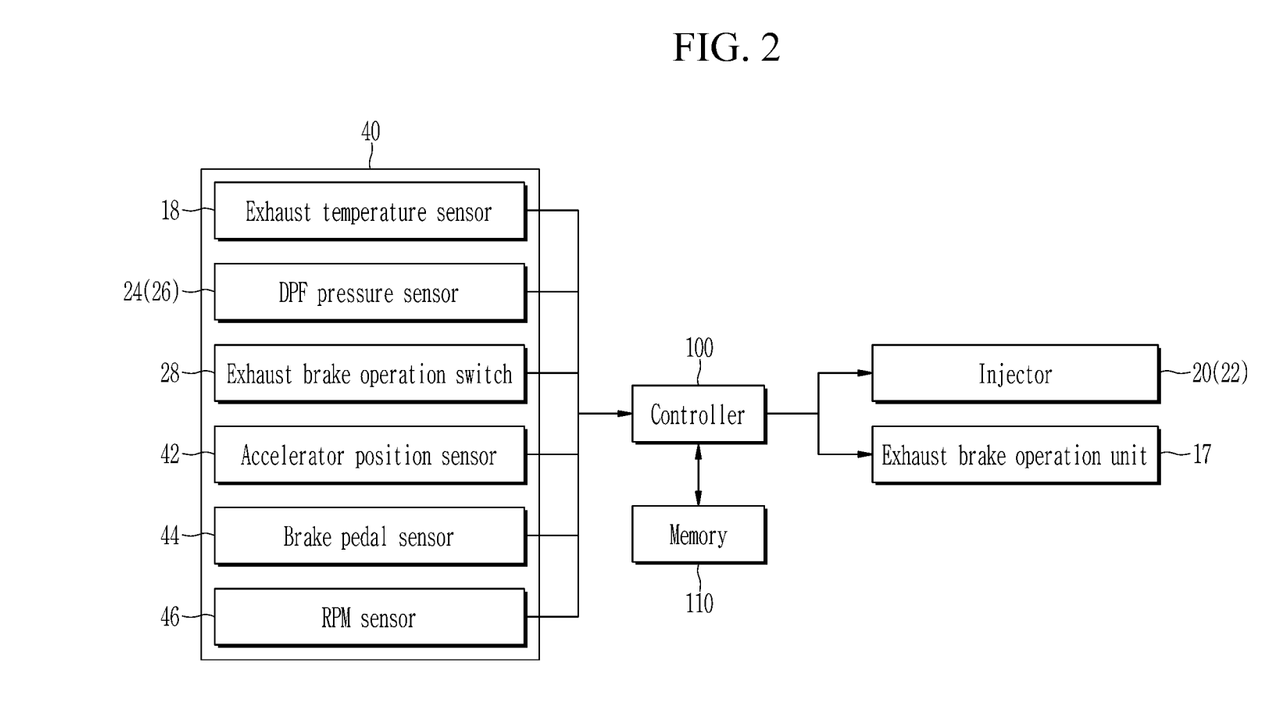
FIG. 2 is a block diagram of an after treatment system to which a post injection control method during exhaust brake operation in another exemplary form of the present disclosure can be applied.

FIG. 2 is a block diagram of an after treatment system to which a post injection control method during exhaust brake operation according to an exemplary form of the present disclosure can be applied.

Referring to FIG. 2, the after treatment system to which the post injection control method during exhaust brake operation according to an exemplary form of the present disclosure is applied, includes a vehicle operation detector 40 that detects operation statuses of a vehicle and outputs corresponding signals, an exhaust brake operation unit 17 that controls an exhaust gas flow of the engine 10, and a controller 100 for controlling the operation of the injector 20 and the exhaust brake operation unit 17 according to the operation signals of the vehicle operation state detection detector 40. Depending on the operation of the exhaust brake operation unit 17, an exhaust brake valve 16 opens and closes to control the exhaust gas flow.

The controller 100 can perform post-injection by controlling the operation of the injector 20 when performing post-injection, or when a separate post injector 22 is mounted, it controls the operation of the post injector 22 to perform post-injection. The post-injection here means fuel injection for regeneration of the diesel oxidation catalyst 12.

The vehicle operation detector 40 may include an exhaust temperature sensor 18, a DPF pressure sensor 24, an exhaust brake operation switch 28 that outputs a corresponding signal according to the driver's operation, an accelerator position sensor 42 that outputs a corresponding signal by measuring an accelerator opening angle, a brake pedal sensor 44 that detects an operation of a brake pedal and outputs a corresponding signal, and an RPM sensor 46 that measures engine RPM and outputs a corresponding signal.

In addition, the after treatment system may further include a memory 110 that communicates with the controller 100, and the memory 110 may store a regeneration condition, a regeneration termination condition, and a post injection amount to be described later.

The controller 100 may be a hardware including at least one microprocessor (e.g., ECU (Engine Control Unit or Electronic Control Unit)) or the microprocessor operated by a predetermined program, and the predetermined program may include a series of commands for performing the post injection control method during the exhaust brake operation according to exemplary form of the present disclosure. The instruction can be stored in the memory 110.

Figure 3:
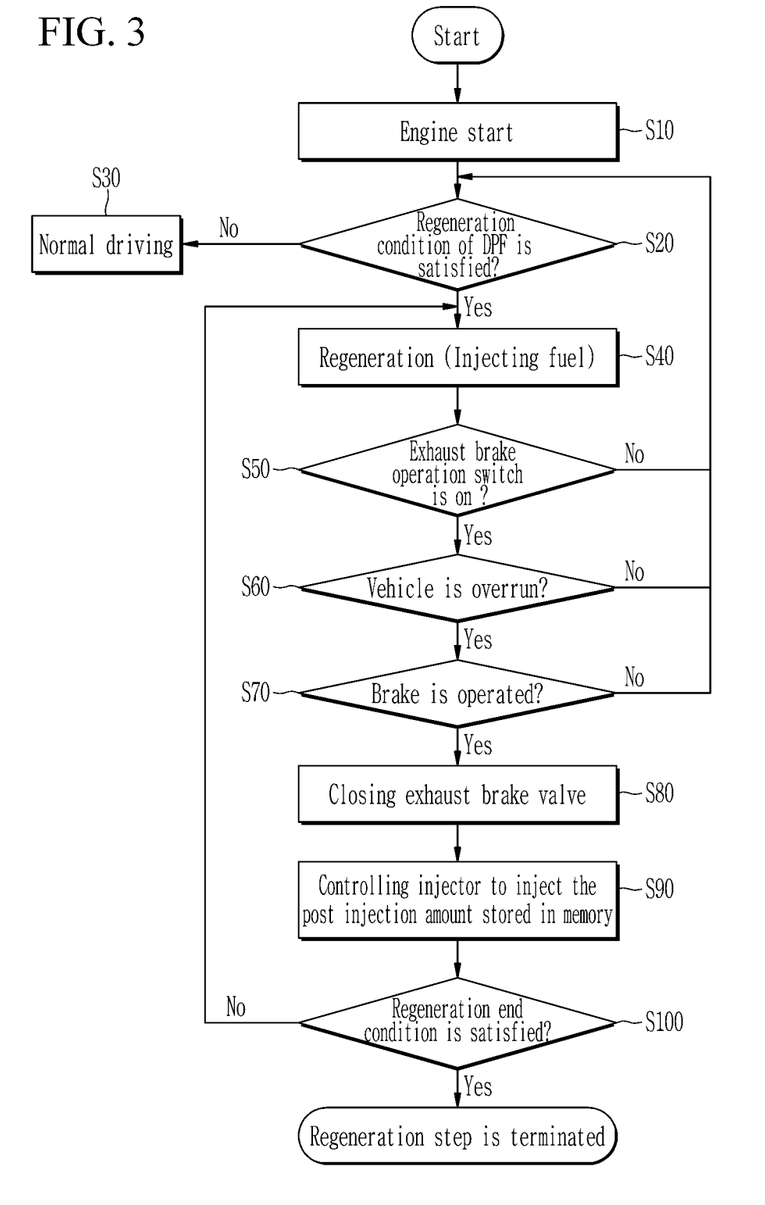
FIG. 3 is a flowchart showing a post injection control method during exhaust brake operation in an exemplary form of the present disclosure.

FIG. 3 is a flowchart showing a post injection control method during exhaust brake operation according to an exemplary form of the present disclosure.

FIG. 1 to referring to FIG. 3, after the engine 10 is started at S10, the controller 100 determines whether a predetermined regeneration condition of the diesel particulate filter 14 is satisfied according to the output signal of the vehicle operation detector 40 at S20.

For example, the predetermined regeneration condition of the diesel particulate filter 14 may be set to satisfy when the output signal of the DPF pressure sensor 24 mounted upstream of the diesel particulate filter 14 corresponds to a predetermined regeneration pressure, or the output signal of the DPF pressure sensors 24 and 26 mounted upstream and downstream of the diesel particulate filter 14 corresponds to a predetermined regeneration differential pressure.

In addition, for example, the predetermined regeneration condition of the diesel particulate filter 14 is set to be satisfied when the vehicle's operating mileage exceeds the regeneration condition mileage stored in the memory 110, or the vehicle's operating time exceeds a regeneration condition operating time stored in the memory 110.

If the regeneration condition is not satisfied, the controller 100 drives the vehicle in the normal driving mode at S30, and if the regeneration condition is satisfied, the controller 100 controls the operation of the injector 20 to perform regeneration at S40.

Here, the regeneration means fuel injection for regeneration of the diesel oxidation catalyst 12, and also means that the injector 20 adds fuel injection for regeneration in addition to fuel injection for driving the engine. In addition, when the post injector 22 for regeneration of the diesel particulate filter 14 is additionally installed, it means fuel injection through the post injector 22.

The fuel supplied through the post-injection is combusted and the particulate material (PM) or soot collected in the diesel particulate filter 14 is removed.

The controller 100 determines whether an exhaust brake operation condition is met during regeneration according to the output signal of the vehicle operation detector 40 at S80. If the exhaust brake operation condition is met during the regeneration, the controller 100 performs post-injection with a predetermined amount of fuel by controlling the operation of the injector (20 or 22) at S90.

The exhaust brake operation condition during the regeneration may include a state that the exhaust brake operation switch 28 is turned on. That is, the controller 100 determines whether the exhaust brake operation switch 28 is on at S50 and when the exhaust brake operation switch 28 is turned on, the controller 100 may determine that it corresponds to the exhaust brake operation condition during the regeneration.

The exhaust brake operation condition during regeneration may include a state that the vehicle is overrun. That is, the controller 100 determines whether the vehicle is overrun according to the signal output from the accelerator position sensor 42 and the output signal of the brake pedal sensor 44 at S60. And when the vehicle is in overrun, it can be judged that the exhaust brake operation condition during the regeneration is satisfied. When the vehicle is in a coasting state because the accelerator pedal and brake pedal do not operate, it may be determined that the vehicle corresponds to the exhaust brake operation condition during the regeneration.

The exhaust brake operation condition during regeneration may include that the brake is in operation. That is, when the brake is operated while the vehicle is overrun and the output signal of the brake pedal sensor 44 is generated at S70, the controller 100 controls the operation of the exhaust brake operation unit 17 to close the exhaust brake valve 16.

When the exhaust brake valve 16 is closed, the amount of air inflow to the engine 10 decreases, and the amount of exhaust gas exhausted from the engine 10 decreases, thereby raising the exhaust gas temperature.

In the case of the diesel oxidation catalyst 12, for example, exposure to exhaust gas above 800 degrees Celsius may cause the catalyst to melt or damage the device.

Figure 4:
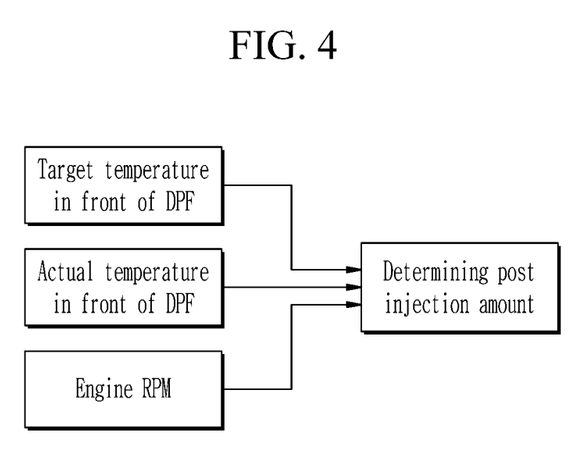
FIG. 4 is a drawing showing a method of determining the post injection amount of the post injection control method during the exhaust brake operation according to an exemplary form of the present disclosure.

FIG. 4 is a drawing showing a method of determining the post injection amount of the post injection control method during the exhaust brake operation according to an exemplary form of the present disclosure.

Referring to FIG. 4, the predetermined amount of fuel for the post injection can be determined by the controller 100 by applying the target temperature in front of the diesel particulate filter 14, the actual temperature in front of the diesel particulate filter 14, and the current engine RPM into a predetermined post injection amount control map, and the control map can be stored in the memory 110.

The post injection amount control map may be preset based on by detecting the target temperature in front of the diesel particulate filter 14, the actual temperature in front of the diesel particulate filter 14, and the temperature change of the diesel oxidation catalyst 12 according to the engine RPM during regeneration.

That is, a temperature sensor is mounted on the diesel oxidation catalyst 12, the test is performed, and the post-injection is performed for a predetermined time to determine whether a temperature peak occurs in advance. Depending on the engine RPM, the difference between the target temperature in front of the diesel particulate filter 14 and the actual temperature in front of the diesel particulate filter 14 is measured to determine the post injection amount as the amount at which the temperature peak of the diesel oxidation catalyst 12 does not occur, and the post injection amount is saved in the memory 110.

In an exemplary form of the present disclosure, the controller 100 controls the operation of the injector (20 or 22) to inject the post injection amount stored in the memory 110 in the case that the exhaust brake operation condition during the regeneration is satisfied at S90.

Thereafter, the controller determines whether a regeneration end condition is satisfied at S100, and when the regeneration end condition is satisfied, the regeneration step is terminated.

Figure 5:
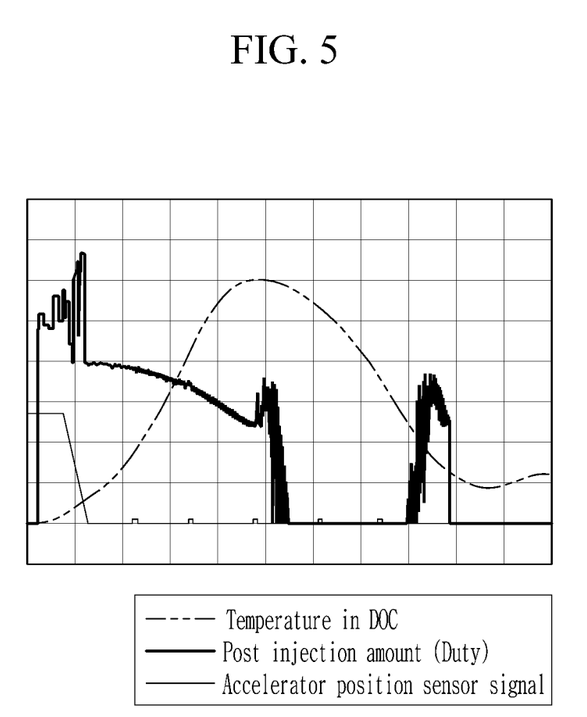
FIG. 5 is a graph showing temperature changes of an after treatment system to which the post injection control method during the exhaust brake operation according to an exemplary form of the present disclosure is applied.
Figure 6:
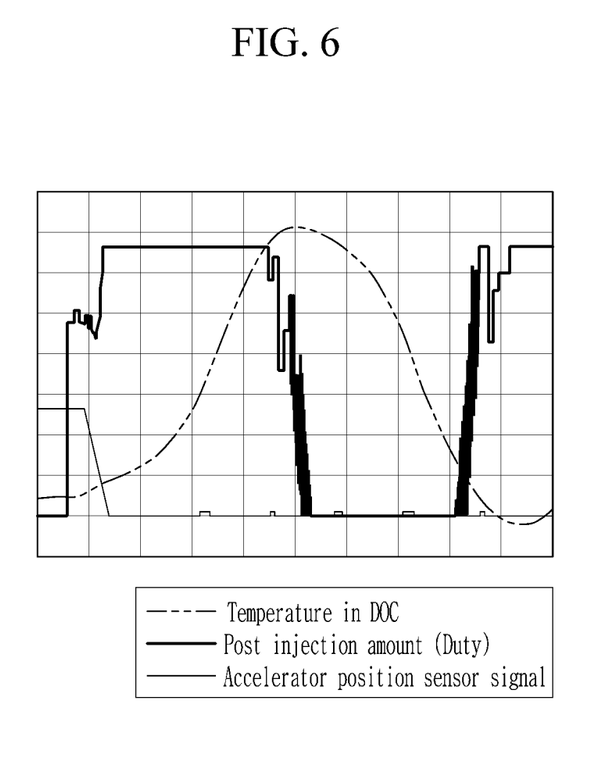
FIG. 6 is a graph showing temperature changes of an after treatment system to which the post injection control method during the general exhaust brake operation is applied.

FIG. 5 is a graph showing temperature changes of an after treatment system to which the post injection control method during the exhaust brake operation according to an exemplary form of the present disclosure is applied, and FIG. 6 is a graph showing temperature changes of an after treatment system to which the post injection control method during the general exhaust brake operation is applied.

Referring to FIG. 5 and FIG. 6, in an exemplary form of the present disclosure, the post injection control method during exhaust brake operation is applied performs the post injection according to the post injection amount stored in the memory 110 when the vehicle overruns according to the output signal of the accelerator position sensor 42, As the post injection amount is reduced compared to the post injection amount in general exhaust brake operation, the internal temperature of the diesel oxidation catalyst 12 can be lowered. That is, it is possible to prevent catalyst malting or damage to the device due to overheating of the diesel oxidation catalyst 12.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

10: engine
12: diesel oxidation catalyst
14: diesel particulate filter
16: exhaust brake valve
17: exhaust brake operation unit
18: exhaust temperature sensor
20: injector
22: post injector
24, 26: DPF pressure sensor
28: exhaust brake operation switch
30: after treatment device housing
40: vehicle operation detector
42: accelerator position sensor
44: brake pedal sensor
46: RPM sensor
100: controller
110: memory

What is claimed is:

1. A post injection control method during exhaust brake operation of a system, wherein the system includes a vehicle operation detector that detects operation statuses of a vehicle, an exhaust brake valve that controls an exhaust gas flow of an engine, a diesel oxidation catalyst, a diesel particulate filter disposed downstream of the diesel oxidation catalyst, an injector for injecting fuel, and a controller for controlling an operation of the injector and the exhaust brake valve based on the detected operation statuses of the vehicle, the post injection control method comprising:
   determining, by the controller, whether a predetermined regeneration condition of the diesel particulate filter based on output signals corresponding to the detected operation statuses from the vehicle operation detector is satisfied;
   when the predetermined regeneration condition is satisfied, performing, by the controller, regeneration by controlling the operation of the injector;
   during the regeneration, determining, by the controller, whether an exhaust brake operation condition is satisfied based on the output signals from the vehicle operation detector; and
   when the exhaust brake operation condition is satisfied during the regeneration, controlling, by the controller, the operation of the injector to perform post-injection with a predetermined amount of fuel,
   wherein the predetermined amount of fuel for the post injection is determined by the controller by applying a target temperature upstream of the diesel particulate filter, an actual temperature upstream of the diesel particulate filter, and a current engine revolutions per minute (RPM) into a predetermined post injection amount control map, and
   wherein the predetermined post injection amount control map is preset based on the target temperature upstream of the diesel particulate filter, the actual temperature upstream of the diesel particulate filter, and a temperature change of the diesel oxidation catalyst according to an engine RPM during regeneration.

2. The post injection control method of claim 1, wherein the exhaust brake operation condition during regeneration includes a state that a vehicle is overrun.

3. The post injection control method of claim 2, wherein the exhaust brake operation condition during regeneration includes a state that an exhaust brake operation switch is on.

4. The post injection control method of claim 3, wherein the exhaust brake operation condition during regeneration includes a state that a brake is in operation.

* * * * *